United States Patent Office 2,746,840
Patented May 22, 1956

2,746,840

PURIFICATION OF CONCENTRATED SALT SOLUTIONS

Clyde W. Davis, Antioch, Calif., assignor to The Dow Chemical Company, Midland, Mich., a corporation of Delaware No Drawing. Application July 24, 1952,
Serial No. 300,767

6 Claims. (Cl. 23—97)

This invention relates to a method for removing impurities from concentrated aqueous solutions of inorganic salts. It relates in particular to a method for removing iron, manganese, copper, chromium, lead and molybdenum ions from concentrated aqueous solutions of zinc chloride, calcium chloride or magnesium chloride.

There are many uses for concentrated salt solutions in which the presence of trace amounts of impurities is undesirable, even though much larger amounts of impurities may be tolerated in other fields of use of such solutions. Concentrated aqueous solutions of zinc chloride may be used as a solvent medium for the polymerization of acrylonitrile, but many of the other metal chlorides which may be present affect the polymerization rate, or the chain length of the polymer obtained, or they contribute undesirable color to fibers of the polymer spun from the solution. Even the minutest detectable amounts of copper salts in a zinc chloride solution adversely affect the polymerization of acrylonitrile in such solutions. In other fields of use, concentrated salt solutions are used to coagulate latex or polymer emulsions. In many such cases it is desirable to avoid contaminating the coagulum with some of the salts which may be present with the coagulant. Again, various colloids are dispersed or dissolved in zinc chloride solutions, or in mixtures of zinc chloride with calcium chloride or magnesium chloride, and the presence of iron, copper, nickel, cobalt, manganese, molybdenum, lead or various other ions in the solution may result in undesired contamination or discoloration of the colloid.

Some of the methods proposed heretofore for the purification of colorless salt solutions, intended to free them of potential discoloring salts, have involved simply a change in valence of the metal ions of the impurities without actual removal of those ions. Other methods have merely involved conversion of the impurities to a more soluble condition. Some of the prior methods have provided means for removing iron, but have had no significant effect on other impurities which may be equally troublesome.

In the course of studies of the use of concentrated solutions of zinc chloride, or of its mixtures with calcium or magnesium chlorides, as media for the polymerization of acrylonitrile and as spinning solutions for converting the polymer to fiber form, it has become apparent that much more effective means are required to remove the above-noted cations from the solution without significant loss of zinc, calcium or magnesium. Such method should be inexpensive, manipulatively simple, and unfailingly reliable. It is the object of this invention to provide such a method.

It has been found that the desired results can be obtained, and that iron, copper, manganese and other ions which may discolor an acrylonitrile polymer or affect its molecular weight may be removed from solutions in water of zinc chloride, calcium chloride or magnesium chloride, or mixtures thereof. The new method comprises bringing the salt solution to be treated (having a salt content over 40 per cent, and preferably near 60 per cent) to a temperature above 50° C., and preferably above 100° C.; adding a water-soluble persulfate to the solution; filtering off the so-precipitated sludge; heating the filtrate to the boiling point to decompose residual persulfate; adding zinc dust, preferably as an aqueous slurry, to the boiling solution; cooling the solution; filtering the solution to remove remaining zinc dust and substantially all of the copper; and preferably treating the filtrate with hydrochloric acid to neutralize any oxide of the principal cation present. The resulting solution is free from all of the metal salts which would have been troublesome in the polymerization of acrylonitrile. The solution is of sufficient purity for use wherever freedom from the suggested cations is desirable.

The following specific example illustrates the practice of the invention:

To 454 pounds of water in a glass-lined kettle was added 1146 pounds of zinc chloride ("technical" grade, about 95 per cent zinc chloride). The resulting solution, of about 68 per cent zinc chloride content, was heated to 125° C., and 8.16 pounds of potassium persulfate was added. A brown, gelatinous precipitate was formed and was separated from the solution by filtration. The precipitate contained 17.1 per cent calcium, 3.2 per cent aluminum, 1.3 per cent iron and 5.1 per cent manganese. The clear filtrate was heated to boiling in a glass-lined kettle, with stirring, to decompose residual persulfate. A water slurry of 1.09 pounds of zinc dust was added to the boiling solution. Boiling and stirring were continued for about an hour, then the solution was cooled and filtered to remove the zinc dust. The filtrate was a clear, water-white solution of zinc chloride, containing not over 0.01 parts per million of copper. The solution was neutralized carefully with hydrochloric acid, to convert zinc oxide to zinc chloride. The resulting clear solution was used as a solvent medium for the polymerization of acrylonitrile, and the polymer products obtained in several batches made under similar conditions were consistent as to molecular weight and gave strong fibers with good physical properties. In contrast, when acrylonitrile was polymerized in some of the initial crude 68 per cent solution of zinc chloride, widely varying but generally low molecular weight polymers were formed, from which relatively weak fibers were made under the same conditions.

When it was attempted to purify the same crude solution by procedures known in the art, inferior results were obtained. Thus, chlorine was bubbled into a sample of the solution, but the impurities did not precipitate. This is believed to be due to conversion of zinc oxide to zinc chloride, and zinc oxide is believed to be necessary at this stage to buffer the solution so that some of the impurities can coagulate. The chlorinated solution was discolored. Similarly, other samples were treated with hydrogen peroxide, and others with zinc peroxide. In these cases, iron impurities were precipitated, but manganese remained in solution. Such solutions could be used in polymerization of acrylonitrile only with catalysts such as hydrogen peroxide or zinc peroxide or organic peroxides, which do not oxidize manganese salts to a colored condition and do not precipitate manganese dioxide, and when using such catalysts, large amounts were required to obtain practical conversion of monomer to polymer.

While many ions may discolor the polymer product, not all impurities in the salt solution are equally objectionable during polymerization. Copper should be eliminated, if possible. Lead and nickel salts adversely affect polymerization at concentrations well within their limits of solubility in concentrated zinc chloride solutions. Iron salts can be tolerated at higher levels, and manganese salts at levels nearly 50 times as great as copper, if polymerization rate and molecular weight only are concerned, but, for colorless polymer products, these salts should be removed. The present procedure effectively accomplishes the desired result, while no known prior procedure does so to a comparable extent and with a satisfactory degree of consistency.

The invention has been illustrated with reference to the purification of zinc chloride solutions. It is applicable as well to the purification of calcium chloride and magnesium chloride solutions, in which cases the presence of small amounts of calcium oxide or magnesium oxide is necessary to buffer the solution until after decomposition of the persulfate. The temperature at which the persulfate treatment occurs in each case is not critical except as it affects the quality of the precipitated sludge. Thus, the higher the temperature, the more granular is the precipitate, and the easier is the subsequent filtration.

The term "water-soluble persulfate" employed herein is intended to include ammonium, sodium and potassium peroxydisulfates, and such others as have at least 1 per cent solubility in water. While zinc "dust" is the preferred reducing and copper collecting agent, other forms of zinc having large surface relative to mass may be used, such as mossy zinc, and this is to be understood in the appended claims.

I claim:

1. The method which comprises adding to a water solution of at least 40 per cent salt concentration wherein the principal solute is selected from the group consisting of zinc chloride, calcium chloride, magnesium chloride, and mixtures thereof, and which contains trace amounts of the oxide of the principal cation present and trace amounts of at least iron and copper salts as impurities, an excess of a water-soluble persulfate over the amount equivalent to the said iron and other cationic impurities present, at a temperature of at least 50° C. to form a precipitate by reaction between the persulfate and some of the said impurities; filtering to remove the precipitate; boiling the filtrate to decompose remaining persulfate; adding zinc dust to the hot solution; cooling the solution; and removing the remaining zinc dust together with the copper which has plated out thereon.

2. The method as claimed in claim 1, wherein, after removal of the zinc dust, the solution is treated with hydrochloric acid to neutralize the oxides of the principal cations present.

3. The method as claimed in claim 1, wherein the initial solution is a water solution of zinc chloride.

4. The method as claimed in claim 3, wherein the persulfate employed is potassium persulfate.

5. The method as claimed in claim 4, wherein the persulfate is added to the zinc chloride solution while the latter is at a temperature of at least 100° C.

6. The method as claimed in claim 5, wherein the zinc chloride solution is of at least 60 per cent concentration.

References Cited in the file of this patent

UNITED STATES PATENTS

| | | |
|---|---|---|
| 1,409,727 | Kardos | Mar. 4, 1922 |
| 2,311,314 | Reichert et al. | Feb. 16, 1943 |
| 2,503,479 | Griffith | Apr. 11, 1950 |

FOREIGN PATENTS

| | | |
|---|---|---|
| 4,706 | Great Britain | of 1904 |

OTHER REFERENCES

Mellor: "Comprehensive Treatise on Inorganic and Theoretical Chemistry," vol. 10, pages 471, 472, Longmans, Green Inc., N. Y., 1930.